United States Patent [19]

Pennington et al.

[11] Patent Number: 4,945,133
[45] Date of Patent: Jul. 31, 1990

[54] OXIDATION OF HALOGENATED POLYMERS AND ANTICAKING HALOGENATED POLYMERS

[75] Inventors: Donald W. Pennington; Joseph L. Allison, both of Baton Rouge, La.

[73] Assignee: The Dow Chemical Company, Midland, Mich.

[21] Appl. No.: 274,877

[22] Filed: Nov. 22, 1988

Related U.S. Application Data

[63] Continuation-in-part of Ser. No. 101,615, Sep. 26, 1987.

[51] Int. Cl.$^5$ .............................................. C08F 8/34
[52] U.S. Cl. .................... 525/261; 525/260; 525/286; 525/302; 525/306; 525/316; 525/313; 525/344
[58] Field of Search ............... 525/302, 306, 316, 313, 525/344

[56] References Cited

U.S. PATENT DOCUMENTS

| | | |
|---|---|---|
| Re. 29,100 | 1/1977 | Patton . |
| 2,181,158 | 11/1939 | Sparks et al. . |
| 2,534,078 | 12/1950 | Strain . |
| 2,586,363 | 2/1952 | McAlevy . |
| 2,959,619 | 11/1960 | Hutchinson . |
| 2,964,517 | 12/1960 | Eck et al. . |
| 2,972,604 | 2/1961 | Reynolds et al. . |
| 2,996,469 | 8/1961 | Cole et al. . |
| 2,996,470 | 8/1961 | Cole et al. . |
| 3,049,523 | 8/1962 | Roussel . |
| 3,222,423 | 12/1965 | Roebuck . |
| 3,260,694 | 7/1966 | Wang . |
| 3,281,345 | 10/1966 | Kuhne . |
| 3,322,711 | 5/1967 | Bush et al. . |
| 3,322,857 | 5/1967 | Bush et al. . |
| 3,329,667 | 7/1967 | Braude et al. . |
| 3,356,638 | 12/1967 | Barrett . |
| 3,379,707 | 4/1968 | Lund et al. . |
| 3,414,556 | 12/1968 | Bungo et al. . |
| 3,418,066 | 12/1968 | Caldwell et al. . |
| 3,448,175 | 6/1969 | Doak et al. . |
| 3,454,544 | 7/1969 | Young et al. . |
| 3,487,037 | 12/1969 | Michel et al. . |
| 3,496,251 | 2/1970 | Takahashi et al. . |
| 3,531,455 | 9/1970 | Straub . |
| 3,541,184 | 11/1970 | Lundberg et al. . |
| 3,558,745 | 1/1971 | Ogawa et al. . |
| 3,642,950 | 2/1972 | O'Shea . |
| 3,644,579 | 2/1972 | Nakajima et al. . |
| 3,676,190 | 7/1972 | Landler et al. . |
| 3,695,915 | 10/1972 | Morris et al. . |
| 3,696,084 | 10/1972 | Gordon . |
| 3,696,172 | 10/1972 | Kaiho et al. . |
| 3,716,391 | 2/1973 | Hosoda et al. . |
| 3,779,963 | 12/1973 | Ancker et al. . |
| 3,819,543 | 6/1974 | Stastny et al. . |
| 3,843,617 | 10/1974 | Orlov et al. . |
| 3,887,648 | 6/1975 | Takahashi et al. . |
| 3,914,339 | 10/1975 | Shima et al. . |
| 3,941,737 | 3/1976 | Horstkorte et al. . |
| 3,945,976 | 3/1976 | McCurdy et al. . |
| 3,960,821 | 6/1976 | Vogt et al. . |
| 4,029,862 | 6/1977 | Liu et al. . |
| 4,056,499 | 11/1977 | Taylor . |
| 4,131,637 | 12/1978 | Bertstein et al. . |
| 4,145,491 | 3/1979 | Ryan . |

(List continued on next page.)

FOREIGN PATENT DOCUMENTS

| | | |
|---|---|---|
| 776773 | 1/1968 | Canada . |
| 817505 | 7/1969 | Canada . |
| 791453 | 3/1958 | United Kingdom . |
| 8303421 | 10/1983 | World Int. Prop. O. . |

OTHER PUBLICATIONS

"Peroxide Curing of Chlorinated Polyethylene Produces Vulcanizates Which Exhibit(1) Improved Air Oven Aging Resistance . . ." Rubber Age, vol. 100, 1968.
Derwent Abstract 05277A/03.
Derwent Abstract 23476D/14.
Derwent Abstract 86218D/47.
Derwent Abstract 62016k/26.
Derwent Abstract 60888P.
Derwent Abstract 08597Q.
Derwent Abstract 30736Q.
Derwent Abstract 27068R.
Derwent Abstract 32210S-AE.
Derwent Abstract 77359U-AG.
Derwent Abstract 38999V/21.
Dersent Abstract 38951V/21.
Dersent Abstract 53929V/30.
Dersent Abstract 76247V/44.
Dersent Abstract 19945W/12.
Dersent Abstract 34942W/21.
Derwent Abstract 13870Y/08.
Derwent Abstract 71930Y/40.
Derwent Abstract 83730Y/47.
Chem Abstract 66:105415e.
Chem Abstract 77:75820r.
Chem Abstract 83: 207709X.
Chem Abstract 93: 27347a.

Primary Examiner—Joseph L. Schofer
Assistant Examiner—John J. Guarriello

[57] ABSTRACT

An oxidized halogenated polymer is prepared by a process comprising (a) forming an admixture of an acidic oxidizing agent and a suspension of a particulate halogenated polymer in a polar liquid; (b) heating the admixture to a temperature sufficient to initiate the reaction between the polymer and the oxidizing agent; and (c) continuing the reaction until an oxidized polymer having a preselected extent of oxidation is obtained. At least one addition polymerizable compound is, optionally, grafted to the oxidized halogenated polymer. The oxidized halogenated polymer and graft copolymers thereof have physical properties different from the halogenated polymer and graft copolymers thereof. Certain graft copolymers are non-caking or free flowing.

11 Claims, No Drawings

U.S. PATENT DOCUMENTS

| | | |
|---|---|---|
| 4,156,671 | 5/1979 | Keown et al. . |
| 4,311,828 | 1/1982 | Imada et al. . |
| 4,419,488 | 12/1983 | Fukumoto et al. . |
| 4,425,206 | 1/1984 | Hutchinson . |
| 4,452,953 | 6/1984 | Benedikt . |
| 4,459,388 | 7/1984 | Hettche et al. . |
| 4,477,633 | 10/1984 | Dawson . |
| 4,486,575 | 12/1984 | Newman et al. . |
| 4,501,859 | 2/1985 | Newman et al. . |
| 4,508,606 | 4/1985 | Andrade et al. . |
| 4,544,709 | 10/1985 | Narui et al. . |
| 4,578,430 | 3/1986 | Davison . |
| 4,584,351 | 4/1986 | Blanchard . |
| 4,591,621 | 5/1986 | Ennis . |

OXIDATION OF HALOGENATED POLYMERS AND ANTICAKING HALOGENATED POLYMERS

CROSS REFERENCE TO RELATED APPLICATION

This application is a continuation-in-part of application Ser. No. 101,615 filed Sept. 26, 1987, which is incorporated by reference in its entirety.

BACKGROUND OF THE INVENTION

This invention generally concerns oxidation of halogenated polymers. More specifically, it concerns oxidation of halogenated polymers using acidic oxidizing agents to modify physical and grafting properties of the polymers, and concerns oxidized and graft polymers so prepared.

Known polymer oxidation processes generally involve harsh conditions, which promote degradation and/or crosslinking of polymer chains as evidenced by viscosity changes and molecular weight changes. The oxidized polymers may even become emulsifiable. See, e.g., U.S. Pat. No. 3,329,667 and U.S. Pat. No. 4,156,671. Many of these processes are complex and require numerous preliminary operations to prepare the polymers for oxidation. Such multistep processes are expensive and often make oxidation of prepared and isolated forms of a polymer impractical. Some preliminary steps of multistep oxidation processes involve dissolving or melting the polymer to be oxidized. Loss of polymer is inherent in each of the steps. Degradation and crosslinking cause additional loss of polymer.

Known polymer oxidation processes are used for hydrocarbon polymers and the like, but are typically not used for halogenated polymers. Oxidative degradation such as that described in Canadian patent 817,505 is, however, sometimes practiced on halogenated polymers. Degradation is evidenced by lowered molecular weight. Additionally, oxygen is sometimes introduced with halogen in processes such as the oxychlorination described in Canadian patent 776,773; however, such processes result in introduction of highly reactive peroxide and hydroperoxide groups, which can lead to instability and degradation.

One object of this invention is to provide an oxidation process suitable for use with halogenated polymers, which causes minimal degredation thereof. Another object of the invention is to provide oxidized halogenated polymers which exhibit modified physical properties.

Yet, another object of the invention is to form graft copolymers of said oxidized polymers by polymerizing monomers or other addition polymerizable compounds in the presence of the oxidized polymers.

Polymers are typically impact modified by being admixed with, being formed in the presence of or being reacted with monomers or polymers known to impart impact strength. Diene polymers such as polymers and copolymers of butadiene are commonly used to impart impact strength. Disadvantages are also experienced with impact modification using diene polymers. Diene polymers typically reduce stiffness or otherwise adversely affect physical properties other than impact properties. Diene polymers also have double bonds which are associated with yellowing on aging or exposure to heat or light. An object of this invention is to prepare impact modified polymers, which have fewer of the disadvantages associated with impact modification using dienes.

SUMMARY OF THE INVENTION

In one aspect this invention is a process of preparing an oxidized halogenated polymer comprising steps of (a) forming an admixture of (1) an acidic oxidizing agent and (2) a suspension of a particulate halogenated polymer in a polar liquid; (b) heating the admixture to a temperature sufficient to initiate reaction between the polymer and the oxidizing agent; and (c) continuing the reaction until an oxidized polymer having a preselected extent of oxidation is obtained.

In another aspect, the invention is an oxidized halogenated polymer produced by the process.

Yet another aspect of the invention is the process of producing a graft copolymer of an oxidized halogenated copolymer comprising steps (a), (b) and (c) above and additionally comprising (d) grafting to the oxidized halogenated polymer at least one addition polymerizable compound graftable thereto, the graft copolymer so produced, and an article of manufacture fabricated with oxidized halogenated polymer produced by the process of the invention as an impact modifier.

Another aspect of the invention is a composition comprising a blend of an oxidized halogenated polymer having carbonyl groups attached thereto and at least one other polymer, which is compatible with the oxidized halogenated polymer.

Oxidized halogenated polymers produced by the process of the invention are effective impact modifiers in a graft copolymers and in blends. Impacts modifiers are considered effective when they impart increased impact strength, generally with increased elongation, to polymers they modify with loss of as little original stiffness, tensile and flexural strength inherent in the unmodified polymer as possible. A first impact modifier is generally more effective than a second when less of the first than of the second is required to achieve the same degree of impact modification; generally, less reduction in inherent stiffness of an impact modified polymer occurs with addition of less impact modifier. An additional property of halogenated olefin polymers oxidized by the process of the present invention that makes them useful as impact modifiers is that they lack double bonds associated with yellowing in diene inpact modified polymers.

The oxidized polymers of the invention and graft copolymers formed therefrom may also be used as polymer processing aids, as components in compositions such as adhesives and the like.

DETAILED DESCRIPTION OF THE INVENTION

Polymers suitable as starting materials for oxidation by the process of the present invention include halogenated olefin polymers and halogenated rubbers. Halogenated olefin polymers include halogenated polymers and copolymers of such olefin monomers as ethylene, propylene, butylene, and the like. Halogenated olefin polymers include chlorinated polyethylene, chlorinated polypropylene, chlorsulfonated polyethylene, chlorinated ethylenepropylene copolymers, chlorinated ethylenebutene copolymers, brominated polyethylene, and the like. The halogenated olefin polymer is beneficially chlorinated polyethylene. Halogenated olefin polymers may be produced, for instance, by dissolving, slurrying, or forming a fluidized bed of an olefin homoor co-polymer and treating the polymer in one or more stages with halogenating agents such as chlorine, bromine and the like. Such processes include, for instance, the processes described in U.S. Pats. No. 3,454,544, Young et al,; 4,029,862, Lui, et al.; and 4,425,206, Hutchinson, the teachings of which are incorporated herein by reference. Halosulfonated polymers may be produced, for instance, by the processes of dissolving, slurrying, or forming a fluidized bed of a polyolefin, such as polyethylene, and treating it with such reactants as chlorine and sulfur dioxide or sulfuryl chloride as described in U.S. Pats. No. 2,972,604, Reynolds, and 4,452,953, Benedikt, the teachings of which are incorporated by reference; or by treating a halogenated polymer with sulfur dioxide and, optionally, a halogen as in the process taught by Blanchard in 4,584,351, the teachings of which are incorporated herein by reference. Halogenated rubbers include polymers such as chlorinated butyl rubber, chlorinated chloroprene and the like. Halogenated rubbers may be produced, for instance, by a process of treating a rubber with a halogenating agent in a reactor having zones for feed, neutralization, injection and mixing as described in U.S. Pat. No. 4,486,575, the teachings of which are incorporated herein by reference.

Halogenated polymers having various degrees of halogenation can be oxidized by the process of this invention. Degress of halogenation vary with the halogen chemically combined with the polymer. Typical chlorinated polyethylenes having a chemically combined chlorine content of from about 1.0 to about 75 percent by weight are suitable for use in the process of the invention. Preferably, the chlorinated polyethylene oxidized by the process of the invention has a chemically combined chlorine content of from about 25 to about 50 percent by weight. Brominated polythylenes suitable for purposes of the invention typically have higher percentages by weight of chemically combined halogen than their corresponding chlorinated polyethylene analogs. Brominated polyethylenes having chemically combined bromine contents of from about 20 to about 80 percent by weight bromine are suitable for oxidation by the process of the invention. Decreasing extents of oxidation as measured by infrared spectrometry are observed with increasing halogen content and, corresponding, decreasing hydrogen content of starting material halogenated polymers. Although the invention is not limited by a mechanistic explanation, decreasing oxidization observed with decreasing availability of hydrogen atoms is consistent with an oxidation involving hydrogen abstraction.

Blends of halogenated olefin polymers with homopolymers and copolymers, which mix with but do not react with said halogenated olefin polymers, may also be oxidized by the process of the invention. Suitable polymers include homopolymers and copolymers and inter polymers of addition polymerizable compounds such as unsaturated aliphatic monomers and vinyl aromatic monomers. Unsaturated aliphatic monomers are compounds having one or more ethylenically unsaturated double bonds and a non-aromatic structure. Polymers of unsaturated aliphatic monomers include polymers such as poly(vinyl chloride), ethylene/vinyl acetate, poly(vinylidene chloride), polyethylene and the like. Vinyl aromatic monomers are those monomers having at least one aromatic ring, preferably a benzene ring, and an ethylenically unsaturated group attached directly to the aromatic ring. Vinyl aromatic monomers include styrene, divinyl benzene, alpha methyl styrene and the like. The presence and amount of other polymers and copolymers may result in physical properties, after oxidation, which differ from those observed when only halogenated olefin polymers are oxidized. For instance, oxidized hydrocarbon polymers have been observed to be degraded or to have increased friction in air. Blends of chlorinated polyethylene with hydrocarbon polymers, when oxidized by the process of the invention, may therefore, show more agglomeration or less viscosity than oxidized chlorinated polyethylene alone. The extent to which these differences in properties are useful, or even tolerable, will depend on the use for which the blend is designed. Useful blends can be readily determined without undue experimentation. For properties similar to the properties of oxidized halogenated polymers alone, blends preferably comprise at least about 80% by weight halogenated polymer.

Halogenated polymers suitable can be of widely varying molecular weight. A polymer suitable for oxidation by the process of the invention has a sufficiently high molecular weight to be solid at reaction temperatures and to be insoluble in polar liquids used to suspend the polymer in the process. The polymers beneficially have a weight average molecular weight from about 50,000 to about 6 million. Advantageously, the polymer has a molecular weight of about 100,000 to about 2.6 million.

The polymer to be oxidized is preferably in the form of particles. The particles preferably have an average diameter of from about 50 microns to about 400 microns, more preferably from about 90 microns to about 275 microns. Especially where particles have radii greater than the depth of penetration of oxidation, using particles having a relatively narrow particle size distribution is beneficial because physical properties are more uniform throughout a mass of polymers formed from the particles than when particles having a broad particle size distribution are used. When particles of a broad particle size distribution are oxidized, some particles are oxidized throughout while others have inoxidized cores.

Bodies of polymer having a smallest dimension larger than 400 microns are suitable for exposure to oxidizing conditions. Such bodies of polymer can, for instance, be in the form of large particles or films. Oxidation of these bodies could not, however, be expected to penetrate more than a few microns. Thus, only the surface of such polymer bodies would be oxidized. One would not expect modification of physical properties throughout the polymer body.

Oxidizing agents suitable for use in the process of the invention are those which form acid solutions on addition to water or other polar liquids used in the process of the invention to form suspensions of particulate halgenated polymer. "Acid solutions", as used herein, denotes solutions having a pH less than about 7. The pH of the solution is preferably less than about 4, and more preferably from about 0.1 to about 2. More preferably, the pH of the solution is from about 0.1 to about 1.0. Heating may be required to make the solution measurably acidic. Oxidizing agents which form such acid solutions are referred to herein as acidic oxidizing agents.

Illustrative acidic oxdizing agents include peroxydisulfuric acid and its alkali and alkaline earth metal salts such as potassium persulfate ($K_2S_2O_8$), sodium persulfate ($Na_2S_2O_8$), potassium monopersulfate ($KHSO_5$)

and the like. Beneficially, the acidic oxidizing agent is peroxydisulfuric acid or one or more of its water soluble salts. Preferably, the oxidizing agent is selected from the group consisting of peroxydisulfuric acid, potassium persufate, potassium monopersulfate, and sodium persulfate. Beneficially, the oxidizing agent used is soluble in the liquid used to suspend the polymer being oxidized. High concentrations of oxidizing agent in some polar liquids result in slurries, while slurries have enough dissolution of oxidizing agent to produce acid solutions. Such slurries are also suitable for use in the process of the invention.

The amount of oxidizing agent used is that which provides a preselected extent of oxidation. Generally, the preselected extent of oxidation is that which introduces a desired amount of carbonyl groups on a polymer or which causes a desired change in physical or grafting properties of a polymer. Infrared analysis of an oxidized polymer shows the presence of carbonyl groups. Relative oxidation numbers are used to ascertain the amount of oxidation that takes place. A relative oxidation number is the ratio of the infrared absorpton at about 1711 to about 1713 $cm^{-1}$ which represents carbonyl groups to the absorption at about 2720 which represents carbon-hydrogen bonds. A preselected extent of oxidation is generally preferably one which is shown by a relative oxidation number of at least about 0.5, more preferably at least about 0.9, and most preferably at least about 1.25. In general, such changes follow use of from about 15 to about 25 parts by weight of oxidizing agent per hundred parts by weight of polymer. Additional oxidation takes place upon use of more oxidizing agent up to a point. When excess oxidizing agent is used, the extent of oxidation is limited by available reaction sites on the polymer. While the upper limit of readily attainable relative oxidation numbers is not determined, in the case of halosulfonated polymers, the process of the invention conveniently yields polymers having relative oxidation numbers of about 3. Lesser extents of oxidation are suitable for certain applications. For instance, an extent of oxidation produced by from about 1 to about 2 weight percent of oxidizing agent based on halogenated polymer is sufficient for achieving grafting at relatively few sites, such as for producing a halogenated polymer having a low degree of blocking.

Preferably, a preselected extent of oxidation is less than that which would produce yellowing, darkening, or a changed physical state like increased waxiness or hardness of the polymer. Such changes in color, physical properties or physical state indicate substantial degradation or crosslinking of the polymer. Degradation is also frequently evideenced by decreases in molecular weight. These changes are generally undesirable whether they become evident before or after the polymer is processed. Halogenated polymers oxidized by the process of the invention are white unless oxidation is allowed to progress to the point of degradation of the polymer.

A change is physical properties is evidenced by a difference in at least one physical property of an oxidized halogenated polymer as compared to the corresponding physical property of the halogenated polymer starting material used to produce the oxidized halogenated polymer. The physical property changed is preferably softness, agglomeration, elongation, or tear strength. Oxidized halogenated polymers are generally softer than the corresponding halogenated polymers which have not been oxidized. Particles of the oxidized polymer tend to agglomerate more than their unoxidized counterparts. The oxidized polymer generally has a higher percent of elongation and a lower tear strength, both as measured according to ASTM 624-54. A change in grafting properties is evidenced by a difference in conditions necessary to obtain a given extent of grafting, a difference in the extent of grafting possible under given conditions or a difference in the tendency of portions of a graft copolymer to separate from one another. Generally, an oxidized halogenated polymer is graftable under milder conditions, to a greater extent or with a reduced tendency to separate from polymers grafted thereto than is a corresponding halogenated polymer starting material.

Additional oxygen sources, such as oxygen or ozone and the like, are preferably to be avoided in the process of the invention. Such additional oxygen or ozone generally results in formation of hydroperoxide or peroxide groups on the polymer, as well as degradation and/or crosslinking of the polymer. While a preferred product may be prepared with exclusion of ambient air, as by use of an inert atmosphere, generally, exclusion of ambient air unnecessary for production of an acceptable product. One skilled in the art can balance complexity of eliminating air against the undesirability of degradation in each situation without undue experimentation.

In carrying out the process of the invention, polymer particles are normally mixed sufficient polar liquid to form a suspension of polymer in the liquid. The liquid is preferably water, but may be an organic or inorganic liquid does not interface with the oxidation. Water is preferred because of its availability, ease of use, and the consistent oxidation obtained therewith, generally without competing reactions between the water and the polymer. Water mixed with another liquid that does not interface with the oxidation is also suitable for use in the practice of the invention.

Generally, dry polymer is added to water, or other polar liquid, and allowed to become wet. When the polymer is wet, one observes that it sinks to the bottom in the case of water or other liquids having densities less than that of the halogenated polymer. Generally, the use of cool water, that is water of about 20° to 35° C. or room temperature, is beneficial. The ratio of polymer particles to polar liquid does not affect the oxidation unless there is insufficient liquid to dissolve or suspend the oxidizing agent or to suspend the polymer and allow adequate contact of polymer and oxidizing agent. Conveniently, about 30 parts by weight polymer will be used with about 70 parts by weight of polar liquid.

As used in this specification, the term "suspension" includes slurries, dispersions and emulsions. When polymers are prepared in emulsion, dispersion or slurry form, oxidation without recovery and resuspension of the polymer is particularly advantageous. Chlorinated polyethylene produced in a slurry process is benefically oxidized without recovery from the slurry. For best results, oxidation should occur after removal or neutralization of materials contained in the suspension which would interfere or compete with oxidation of the polymer.

Recovered and dried halogenated polymer particles are often treated or mixed with materials such as calcium carbonate and the like that may interfere with subsequent oxidation. Such materials may, for instance, compete with the polymers for the oxidizing agent, change reaction media conditions like acidity, or physically block the attack of oxidizing agent on the polymer. Before such polymer particles are oxidized, they should be treated to remove the materials. Washing with dilute acid, such as hydrocloric acid, often removes the materials. Those skilled in the art will without undue experimentation readily discern other means of removal.

The oxidizing agent is admixed with the halogenated polymer suspension to form a reaction mixture. The oxidizing agent may be added to the liquid before or after the polymer is added thereto. Addition of the oxidizing agent to a formed polymer suspension is generally convenient. The oxidizing agent may be added directly to the suspension. Alternatively, it may first be mixed with a portion of liquid, generally water, and then added to the suspension. Beneficially, the oxidizing agent will be present in concentrations sufficient to react with the polymer at a practically acceptable rate while avoiding polymer degradation or excessive foaming. The polymer may be treated with a solution containing as little as about one part by weight of oxidizing agent per hundred parts by weight of solution. Beneficially, the concentration of oxidizing agent in solution is about 1 to about 30% by weight based upon total solution weight, advantageously about 8 to about 10 % by weight. To avoid the use of inconveniently long process times at low process temperatures like from about 25 to about 35° C., however, use of at least about 10% by weight of the oxidizing agent is preferred.

The reaction mixture is heated to a temperature sufficient to initate oxidation of the halogenated polymer. During oxidation, the temperature generally should be kept below the melting point of the halogenated polymers, both before and after oxidation. The temperature should also be kept below that which would cause substantial degrading or crosslinking of the halogenated polymer or the oxidized polymer. Substantial degrading is evidenced by yellowing, darkening, or lowering of molecular weight or melting point. Substantial crosslinking is crosslinking sufficient either to interfere with subsequent fusion of the polymer particles or to harden the particles or make them less resilient. Generally, the reaction mixture is heated to a temperature from about 35° to about 100° C. For oxidation of chlorinated polyethylene the temperature is beneficially from about 60° to about 90° C.

As the temperature reaches that at which oxidation occurs for a given polymer and oxidizing agent combination, the pH of the liquid begins to decrease. For instance, oxidation of chlorinated polyethylene with potassium persulfate begins at a temperature of from about 55° to about 65° C. However, a temperature of about 25° C. is sufficient for oxidation when ions, such as iron and silver, which act as trace catalysts, are present as contaminates or added salts.

In the oxidation of any halogenated polymer, it is generally beneficial to heat the reaction mixture to a temperature of about 25 to 50 degrees above that at which some reaction is observed in order to complete the oxidation to the extent preselected, in a practical period of time. After oxidation is complete, the temperature is beneficially raised to, or held at, a temperature of from about 80° to about 90° C. or even higher to destroy peroxide or hydroperoxide groups that may have formed. Such temperature should be held until exothermic reaction is no longer observed. In some instances, such as when the oxidized halogenated polymer is to be grafted, this heating step is, optionally, omitted.

For a given reaction, pressure, like temperature, is interrelated with reaction time, the polymer being oxidized, the preselected extent of oxidation, the oxidizing agent and the concentration of oxidizing agent. Halogenated polymers can be satisfactorily oxidized at atmospheric pressure. Pressures greater or less than atmospheric pressure are suitable for the process of the invention, but are generally unnecessary. At atmospheric pressure and about 60° C., oxidation of chlorinated polyethylene, for instance, takes from about one to about six hours, depending on the extent of oxidation preselected.

Controlling the acidity of the reaction mixture of polymer suspension and oxidizing agent is not necessary. Under constant reaction conditions, the pH starts to decrease when oxidation begins and continues to decrease until there is no more oxidizing agent or no mre sites on the polymer which can react under the reaction conditions. This correspondence of pH change to ongoing reaction can be used to detect presence or absence of reaction and controlably reach a preselected extent of oxidation incrementally. Oxidizing agent is added incrementally and, each time pH becomes constant after having decreased, additional oxidizing agent is added to obtain additional oxidation until the preselected extent of oxidation is reacted. Ongoing reaction is also indicated by foaming during oxidation and cessation of foaming which is belived to indicate that either all the oxidizing agent or available polymer sites have reacted.

The oxidized polymer particles are suitably separated from the suspension, washed with water or another nonreactive liquid until unreacted oxidizing agent and byproducts of reaction are substantially removed, as is indicated in the case of water, when no further pH change in the wash liquid is observed. Suitably, the particles are then dried. Separation, washing and drying are all accomplished by conventional means.

In the case of oxidations using peroxydisulfuric acid and its salts, there will be sulfate ions produced during the oxidation reaction. When a liquid phase is separated from the oxidized polymer particles and/or the particles are washed with a liquid, the sulfate ions are in liquid from the separation or washings. These sulfate salts are preferably used to regenerate peroxydisulfuric acid or persulfate salts for use in succeeding oxidations. The peroxydisulfuric acid or its salts may be regenerated by means known in the art for producing persulfate ions from sulfate ions. Regeneration is preferably accomplished by electrolyzing the sulfate ions into persulfate ions. Known means of concentrating such salt solution may be used if desired.

Infrared analysis of the oxidized halogenated polymers indicates the presence of carbonyl groups as well as halogen and hydrogen substituents. There is no evidence of hydroperoxide, peroxide or hydroxyl groups in chlorinated or chlorosulfonated polyethylene oxidized by the process of the invention. The carbonyl groups are believed to be more reactive than hydrogens or halogens as sites for grafting or crosslinking. The differences in reactivity may explain the improved graftability of the oxidized polymer over the unoxidized polymer.

The oxidized halogenated polymers may be further processed in the same manner as halogenated polymers which have not been oxidized. For instance, they may be blow molded, injection molded, extruded, calendered, mixed in a Banbury-type mixer and the like. So processed, they may be formed into films, membranes, sheets, shaped articles, etc.

The oxidized halogenated polymers may be used alone or in blends with other polymers compatible therewith. Suitable addition polymers include homopolymers, copolymers, and interpolymers of unsaturated aliphatic monomers such as ethylene, vinyl acetate, vinyl and the like or of vinyl aromatic monomers, such as styrene, divinyl benzene, alphametyl styrene and the like, or mixtures thereof. Preferred addition polymers include ethylene vinyl acetate, poly(vinyl chloride), polystyrene and copolymers of styrene and such monomers as acrylonitrile and divinyl benzene. The oxidized polymers may also be blended with condensation polymers including polyesters, polyamides, polyamines, polyethers, phenol formaldehyde resins and the like. For instance, enhanced impact strength, or other improved physical properties results when chlorinated polyethylene, oxidized by the process of the invention is blended with such polymers. A desired relative proportion of an oxidized halogenated polymer of the invention in a blend depends on the property to be modified, the desired value of that property and the value of that property in the polymer or polymers with which the oxidized polymer is to be blended. Oxidized polymers of the invention are particulary useful in increasing impact strength of blends into which they are incorporated. Increasing the proportionate amount of oxidized polymer in a blend generally increases Izod impact strength as measured by ASTM D-256, and generally decreases stiffness as indicated by flexural strength as measured by ASTM D-790. However, chlorinated polyethylene having a chemically combined chlorine content of about 36 weight percent, and having been oxidized by the process of the invention, is an impact modifier which increases impact properties with relatively little loss of stiffness as compared with the loss of stiffness observed using common impact modifiers. One skilled in the art will readily perceive how to balance requirements for properties of impact and stiffness to achieve optimum properties for a specified application.

In typical poly(vinyl chloride) applications, blends such as appliance and electrical wire plugs, pipes and fittings therefor, gutters, downspouts, window frames and siding for buildings and the like, a desirable Izod impact value is at least about 2 foot pounds per inch and is often practically limited by decreased stiffness to less than about 20 foot pounds per inch (ft. lb/in), that is from about 0.1 to about 1 kilogram meters per centimeter (kg. m/cm). Such an impact value is achieved by blending from about 10 to about 15 weight percent of oxidized chlorinated polyethylene having from about 34 to about 36 percent chemically combined chlorine into poly(vinyl chloride), said chlorinated polyethylene having been oxidized with an excess of acidic oxidizing agent. For applications requiring less stiffness than those listed, more impact strength may be achieved by adding more than about 15 percent oxidize halogenated polymer.

The oxidized polymers of the invention are especially suitable for use in grafting reactions with one or more addition polymerizable compounds graftable thereto. Such compounds are generally free-radical polymerizable ethylenically unsaturated monomers. Illustrative monomers include divinyl benzene, styrene, acrylonitrile, vinyl toluene, acrylamide, vinyl acetate, methylmethacrylate, hydroxyethyl methacrylate, ethylmethacrylate, glycidyl methacrylate, isobutylmethacrylate, n-octyl methacrylate, n-butylmethacrylate, cyclohexylmethacrylate, the corresponding acrylates, acrylic acid, methacrylic acid, and the like. Preferred monomers include styrene, acrylonitrile, methylmethacrylate, hydroxyethyl methacrylate, ethylmethacrylate, methylacrylate, ethylacrylate, acrylic acid, and, methacrylic acid. Other suitable compounds graftable to the oxidized polymers include free radical polymerizable addition products of such monomers, such as dimers, trimers, tetramers, oligomers and higher polymers thereof.

The term "grafting" is used herein to include processes of chemically bonding polymerizable compounds to a backbone polymer. The polymerizable compounds will generally polymerize before or during the grafting process, forming pendant side chains on the backbone polymer. As such the term "grafting" includes processes such as interpolymerization.

The grafting processes comprise a combination of steps as follows:
(1) contracting the oxidized polymer with at least one compound graftable thereto;
(2) initiating reaction between the oxidized polymer and said compound; and
(3) continuing the reaction until a graft copolymer having a preselected extent of grafting is obtained.

Oxidized polymers are suitably contacted with free-radical polymerizable compounds in systems known to those skilled in the art for bulk, mass, solution, emulsion, suspension, mass-suspension, bulk-suspension polymerization and the like. Typically, an admixture of oxidized polymer, beneficially in finely divided form, with the free-radical polymerizable compound is formed. The admixture may suitably be a simple mixture or solution of the oxidized polymer in the polymerizable compound, or a solution of both the polymer and polymerizable compound in a common solvent. A dispersion, slurry, suspension or emulsion of either the polymerizable compound or the oxidized polymer in a solution of the other is also a suitable mixture. A dispersion, slurry, suspension or emulsion of both the polymerizable compound and the oxidized polymer in a non-solvent for both is also a suitable form of admixture. When a reaction mixture in which a halogenated polymer has been oxidized by the process of the invention is substantially free of materials which would interfere with subsequent grafting, the polymerizable compound may be contacted with the oxidized polymer in the reaction mixture.

Solution grafting processes are, generally, preferred for producing graft copolymers of the invention. The oxidized halogenated polymer is suitably dissolved in a solvent therefor to form a starting solution. The solvent may be a monomer such as styrene, vinyl toluene, acrylic or methacrylic acid and esters thereof, acrylonitrile and the like and mixtures thereof to be grafted onto the oxidized polymer. Other solvents such as ethylbenzene, benzene, toluene, isooctane and the like may be used alone or in combination with a monomer to be grafted to the oxidized polymer. Desirably, the monomers to be grafted onto the oxidized halogenated polymer and any additives, such as polymerization aids and stabilizers, are mixed thoroughly with the polymer. A homogeneous admixture is beneficially formed.

Mass graft polymerization wherein an oxidized halogenated polymer is mixed with, but not dissolved in, a monomer is preferred for grafting oxidized halogenated polymers not easily soluble in a monomer to be grafted thereto. Solubility generally decreases with increasing chemically combined halogen content and with increasing molecular weight. Preformed polymers are also suitably grafted to an oxidized halogenated polymer. Grafting during extruding and the like is also suitable for use in the practice of the invention. Details of specific processes are illustrated in U.S. Pat. Nos. 3,322,857 to Bush et al.; 3,448,175 to Doak et al.; 3,496,251 to Takahashi et al.; 3,558,745 to Ogawa et al.; 3,642,950 to O'Shea; 3,644,579 to Nakajima et al.; 3,696,172 to Kaiho et al.; 3,887,648 to Takahashi et al.; 3,914,339 to Shima et al.; 3,945,976 to McCurdy et al. and 4,419,488 to Fukumoto et al., which patents are incorporated herein by reference. In using each process, an oxidized halogenated polymer of the invention is substituted for a halogenated polymer or rubber, and an admixture of the oxidized halogenated polymer with at least one compound to be grafted thereto is formed.

The admixture is then exposed to a polymerization initiator to initiate reaction between the oxidized polymer and the compound graftable thereto. The reaction is continued at a temperature and pressure and for a time sufficient to achieve a preselected extent of grafting. The graft polymerization beneficially takes place in an inert gaseous atmosphere. For example an inert atmosphere may comprise gaseous nitrogen maintained at a pressure of about 25 psig (pounds per square inch gauge) (172 kilopascals gauge).

Initiating the reaction is accomplished using heat, a chemical polymerization initiator, or wave energy such as radiation, ultraviolet light and the like and combinations thereof. Suitable chemical polymerization initiators include peroxides such as benzoyl peroxide, lauroyl peroxide, t-amylperoxide, 2,4-dichlorobenzoyl peroxide, acetyl benzoyl peroxide, acetyl cyclohexyl sulfonyl peroxide, t-butyl hydroperoxide, t-butyl peroxyneodecanoate, isopropyl peroxy carbonate, 2,2-bis(t-butylperoxy)butane, or other organic peroxides, perborates and other inorganic peroxides; azo compounds such as azobisbutyronitrile, and the like; and combinations thereof. The quantity of initiator will generally be varied depending on quantities of free-radical polymerizable compound and diluent, if any. When oxidizing agents such as sodium and potassium persulfate are, optionally, used in excess of the amount needed for oxidation, such agents may function as polymerization initiators.

Beneficially, agitation or stirring is maintained during a graft polymerization process. Such stirring during polymerization generally results in bodies of graft copolymers forming in the admixture. In the case of solution polymerization, as reaction continues, particles of graft copolymers enlarge and generally become insoluble in the reaction mixture. Thus, the graft copolymers separate from a stirred reaction mixture as they are formed. Polymerization maly also take place without stirring, in which case an interpenetrating network of oxidized halogenated polymer and polymer of the monomers present in the reaction mixture will generally form.

Polymerization aids such as chain transfer agents, molecular weight modifiers, solvents, suspending agents, emulsifiers, buffers, polymerization initiator activators and the like, may suitably be used in the grafting process. Those skilled in the art will recognize which polymerization aids are useful for a given purpose and how the aids should be used. Particle porosity modifiers, non-inhibiting heat stabilizers, non-interfering plasticizers, fillers, pigments, and other modifiers known in the art are also suitably used. Stabilizers and antioxidants conventionally used in preparation of vinyl polymers and copolymers are generally suitable for stabilizing polymers of the present invention. Examples include organic complexes, oxides and/or salts of lead, tin, barium, cadmium, magnesium, and sodium; phosphites; phosphates; hindered phenols; epoxy compounds; thioesters and amine antioxidants. When a chain transfer agent is used, a mercaptan, such as tert-dodecyl mercaptan or n-dodecylmercaptan, is suitably used.

The graft copolymer is suitably recovered from the reaction mixture using conventional procedures, such as devolatilization of solvents and residual monomers, and the like. After recovery, the graft polymer may be further processed in the same manner as known graft polymers. For instance, they may be blow molded, injection molded, extruded, calendered, mixed in a Banbury-type mixer and the like. So processed, they may be formed into films, membranes, sheets, shaped articles, etc.

A relative proportion of an oxidized halogenated polymer of the invention to be used in a graft copolymer is selected considering the property to be modified, the desired value of that property and the value of that property in a corresponding polymer without the oxidized polymer. Oxidized halogenated polymers of the invention are especially useful for modifying impact strength. A relatively small proportion of oxidized halogenated polymer in a graft copolymer increases impact strength, but also generally decreases stiffness. Properties other than impact strength and stiffness also vary with relative proportion of oxidized halogenated polymer of the invention incorporated into a graft copolymer. For instance, the percentage of elongation before break is generally increased upon increasing the relative proportion of oxidized polymer of a given extent of oxidation. Those skilled in the art will recognize how to balance impact strength, stiffness and other properties to meet the requirements for specific applications.

It is frequently useful in injection molded applications to use an impact modified styrene/acrylonitrile graft copolymer having an Izod impact strength as measured by ASTM D-256 of at least about 2 ft-lb/in., that is, about 0.1 kg-m/cm. In such applications as housings and parts of office machines, such as calculators, copy machines and the like; for housings and parts of home appliances such as television sets, electronci ovens, audio and video tape recorders and the like; for parts of electrical components such as switches, connectors, measuring instruments, and the like, a typical practical range of Izod impact strength is from about 2 to about 12 ft-lb/in or from about 0.1 to about 0.65 kg. m/cm. Such an impact modified styrene/acrylonitrile copolymer is suitably produced, for instance, using from about 20 to about 27 percent by weight, based on graft copolymer, of oxidized chlorinated polyethylene having a chemically combined chlorine content of from about 34 to about 36 percent by weight and having been oxidized using an excess of acidic oxidizing agent.

The oxidized halogenated polymers or graft copolymers thereof may be combined with other components such as fillers, pigments, stabilizers, processing aids and the like. Amounts and types of "other components" added will vary depending upon factors such as cost and effect upon composition properties.

Fillers which may be used in compositions of the present invention are finely-divided, inorganic materials of natural or synthetic origin in the form of regular or irregular particles, platelets or fibrous pieces. Suitable materials include various types and grades of calcium carbonate (whiting), calcium sulfate, mica, talc, kaolin and other clay minerals, silicates, silica, barytes, magnesium oxide, magnesium carbonate, aluminium trihydrate and the like, and mixtures of such fillers.

Organic and mineral pigments which may be used in combination with the polymers of the invention include, for example, carbon black, titanium dioxide, iron oxide and the like as well as mixtures thereof may be used to obtain desired colors. Processing aids such as stearic acid, waxes, etc. may be incorporated into compositions containing the polymer of the invention thereby obtaining further improved milling and calendering characteristics.

Stabilizers conventionally used in preparation of vinyl polymer and copolymer compositions are generally suitable for stabilizing polymers of the present invention. Examples include organic complexes, oxides and/or salts of lead, tin, barium, cadmium, magnesium, and sodium; phosphites; phosphates; hindered phenols; epoxy compounds; thioesters and amine antioxidants. Specific examples include dibasic lead phthalate, dibasic lead phosphate, lead oxide, magnesium oxide, sodium phosphate, magnesium carbonate, barium-cadmium stearate, tris-nonylphenyl phosphite, octadecyl-3-(3,5-di tert-butyl-4-hydroxy phenyl) propionate, tert-butyl pyrocatechol, 2,6-di-tert-butyl-p-cresol, epoxidized soybean oil, dilaurylthiodipropionate, N,N-diphenyl-p-phenylenediamine and the like. Suitable quantities of such stabilizers can be determined by those skilled in the art without undue experimentation.

Blends of the oxidized polymers or graft polymers prepared therefrom with other polymers are suitably mixed by means known to those skilled in the art such as by a heated two roll mill, a Banbury type mixer, an extruder or equivalent mixing and compounding equipment.

Grafting halogenated polymers is particularly useful for the purpose or producing halogenated polymers which exhibit little blocking or caking. While any extent of oxidation and grafting can be used for the purpose, it is generally preferable to preserve other physical properties of the halogenated polymer by introducing grafting on relatively few sites on the halogenated polymer. The number of sites introduced are advantageously kept relatively low by using relatively low amounts, preferably from about 0.5 to about 2 percent by weight, more preferably from about 0.5 to about 1 percent by weight based on halogenated polymer, of oxidizing agent.

While oxidized, halogenated polymers produced using relatively little oxidizing agent can be isolated and subsequently grafted using any process described above, it is advantageous to add the monomer to be grafted directly, that is without interventing purification or isolation steps, to a suspension of oxidized halogenated polymer formed by reaction of the oxidizing agent with a suspension of halogenated polymer. The monomer is suitably added in any form, for instance, neat, in solution or in suspension. In such a process, it is generally preferred that the suspension of halogenated polymer and oxidizing agent be heated to at least about 60°-65° C., but more preferably below about 92° C., for sufficient time to oxidize the halogenated polymer, preferably at least about 4 hours. The oxidized halogenated polymer is preferably cooled to below the boiling point of a monomer to be grafted thereto, conveniently to about ambient temperature or 35° C. Then the monomer is added, and the temperature is increased sufficiently to polymerize the monomer, preferably from about 62° C. to about 92° C., more preferably from about 72° C. to about 85° C., for a sufficient time to form the graft polymer, preferably from about 30 minutes to about 1.5 hours.

Any monomer suitable for grafting to an oxidized halogenated polymer is suitable for preparing such graft polymers exhibiting little blocking. Preferred monomers include styrene, vinyl toluene and unsaturated esters having from about 4 to about 15 carbon atoms. The more preferred monomers include styrene, vinyl toluene, vinyl acetate, methylmethacrylate, ethylmethacrylate, butylmethacrylate (all isomers), methylacrylate, ethylacrylate, butylacrylate (all isomers), propylacrylate, 2-ethylhexylacrylate and mixtures thereof. The monomers are preferably used in an amount of from about 1 to about 40, more preferably from about 2 to about 20, most preferably from about 15 to about 20 percent by weight based on weight of grafted oxidized halogenated polymer.

The grafted product formed using such modifications of the oxidizing and grafting process of the invention is generally a free flowing, granular solid, which is generally non-caking. The product is preferably also white. Caking is advantageously determined subjectively by visual observation. When there is caking, clumping or agglomeration is observable. Halogenated polymer which has been neither oxidized nor grafted generally forms cakes or blocks on standing or with application of heat and/or pressure. The force required to break such a block is generally measurable. Conveniently, 50 grams of a particulate polymer is heated at 60° C. for 3 hours under 60 pounds per square inch (guage) (psig) of pressure in a stainless steel holder to form a plug about 2⅛ inch in diameter. The force required to push a wedge through the plug is measured. Whereas forces in excess of 20, frequently in excess of 100 or 200, sometimes in excess of 500 pounds of force are required to break blocks of unoxidized ungrafted halogenated polymer, grafted oxidized halogenated polymers of the invention generally do not form a block under the stated conditions. The term "free flowing" is used herein to designate those polymers which at 60° C. under 60 psig. do not form blocks requiring measurable force to break. The term "non-caking" is used herein to designate those polymers which are free flowing or which under the designated conditions, form blocks requiring less than about 5 pounds of force to break.

The following examples are only for purposes of illustrating the process and products of the invention and are not to be viewed as limiting the present invention. All parts and percentages are on a weight basis unless otherwise stated. Examples of the present invention are represented by Arabic numerals whereas comparative samples are represented by alphabetic characters. Molecular weights are weight average molecular weights. Particle sizes given are diameters expressed as volume average particle sizes.

EXAMPLE 1

OXIDATION OF CHLORINATED POLYETHYLENE

About 600 grams of finely-divided chlorinated polyethylene particles are placed in a four liter beaker containing about 2500 grams (g.) of water. The chlorinated polyethylene has a molecular weight of about 280,000, a chemically combined chlorine content of about 36 percent by weight, and an average particle size of about 260 microns (commercially available from The Dow Chemical Company under the trade designation Tyrin ® 3615). The beaker and its content are allowed to sit until the chlorinated polyethylene particles sink or settle, indicating wetting of the polymer.

The contents are treated with diluted hydrochloric acid to remove possible contaminants. Addition of hydrochloric acid is continued until foaming ceases. Then the polymer is washed with water until the water has a neutral pH. The volume of water is adjusted to about 2500 milliliters (ml.).

A slurry of the halogenated polymer in water is maintained in suspension by stirring with a propeller about 120 revolutions per minute (rpm). About 125 grams of granular potassium persulfate is added steadily over a period of about 15 seconds. The slurry is heated to about 72° C. The temperature rises to about 90° C. because of exothermic reaction. During the time, foaming is noted and interpreted as indicating reaction. On cessation of the initial foaming, and return of the temperature to 72° C., an additional 125 grams of potassium persulfate is added and observed to cause additional foaming. The temperature again rises to about 90° C. and falls to 72° C. which is maintained by heating. The period of time from the first addition of potassium persulfate until the second return to 72° C. is about 1.5 hours. When foaming stops after the second addition of potassium persulfate, the slurry is heated to about 90° C. to destroy any peroxide or hydroperoxide groups that might have formed.

The oxidized polymer particles float on an aqueous phase at this stage. Water is added to the aquesou phase until aqueous phase becomes less concentrated and less dense than the particles, and the polymer particles sink. Then the aqueous phase is decanted from the particles. Portions of water are added to the particles, agitated and decanted until the water is neutral to litmus paper. The polymer particles are filtered from the water and dried in a vacuum oven at 50°-60° C. for 12 hours.

A sample of about 15 grams of dried oxidized polymer particles is placed between polytetrafluoroethylene sheets and in a circular compression mold preheated to 150° C. A force equivalent to 25,000 kilograms (kg.) of weight is applied. The temperature is maintained at 150° C. for a period of 10 minutes. Then the sample is cooled in the mold under pressure for a period of 10 min. until it reaches a temperature of 30° C. A film 8 inches (20.3 cm.) in diameter and 5 mils (0.125 mm) thick is formed.

Infrared analysis of the film shows a band in the region of 1711-1713 cm$^{-1}$ corresponding to carbonyl groups. The band is not present in the spectrum of the unoxidized chlorinated polyethylene starting material.

About 150 g. of dried oxidized polymer particles are placed in a 8 in. by 6 in.×0.125 in. thick (20.3 cm×15.2 cm×0.32 cm thick) mold and heated to 225° C. over a period of 16 minutes. A 25,000 kg force is applied for a period of 16 minutes to form a solid sheet having dimensions of 8 in.×6 in.×0.125 in. thick (20.3 cm×15.22 cm×0.32 cm thick). The sheet is cut into shapes specified by ASTM D-624-54 for testing. Cutting is accomplished using saw and router. Physical properties measured are shown in Table I.

EXAMPLE 2

OXIDATION OF CHLORINATED POLYETHYLENE

The process of Example 1 is repeated except that the chlorinated polyethylene resin has a weight average molecular weight of about 100,000, a chemically combined chlorine content of about 46.5 percent, and an average particle size of about 260 microns in diameter. Physical properties are measured and shown in Table I.

EXAMPLE 3

OXIDATOIN OF ULTRA HIGH MOLECULAR WEIGHT CHLORINATED POLYETHYLENE

The process of Example 1 is repeated except that the chlorinated polyethylene resin has a weight average molecular weight of about 2,600,000, a chemically combined chlorine content of about 36 percent and an average particle size of about 260 microns.

EXAMPLE 4

OXIDATION OF CHLORINATED POLYETHYLENE

The process of Example 1 is repeated except that the chlorinated polyethylene resin has a weight average molecular weight of about 280,000, a chemically combined chlorine content of about 36 percent, and an average particle size of about 260 microns, and is produced on a pilot scale.

EXAMPLE 5

OXIDATION OF CHLORINATED POLYETHYLENE OF LOW CHLORINE CONTENT

The process of Example 1 is repeated except that the chlorinated polyethylene resin has an average molecular weight of about 280,000, a chemically combined chlorine content of about 25 percent, and an average particle size of about 260 microns. It has a residual crystallinity of about 28 percent.

Infrared analysis of a film formed from the dried oxidized polymer shows absorbance in the 1715 cm$^{-1}$ region, indicating presence of carbonyl groups in the polymer. The ratio of absorbance at about 1715 cm$^{-1}$ to that at about 2720 cm$^{-1}$ (corresponding to carbon hydrogen stretch) is 0.51. Physical properties of the oxidized chlorinated polyethylene are in Table I.

EXAMPLE 6

OXIDATION OF CHLORINATED POLYETHYLENE

The process of Example 1 is repeated except that the resin has a weight average molecular weight of about 280,000, a chemically combined chlorine content of about 42 percent, and an average particle size of about 260 microns.

Infrared analysis of a film formed from the dried oxidized polymer shows absorbance in the 1715 cm$^{-1}$ region, indicating presence of carbonyl groups in the polymer. The ratio of absorbance at about 1715 cm$^{-1}$ to that at about 2720 cm$^{-1}$ (corresponding to carbon hydrogen stretch) is 1.38. Physical properties of the oxidized chlorinate polyethylene are in Table I.

EXAMPLE 7

OXIDATION OF CHLOROSULFONATED POLYETHYLENE

The process of Example 1 is repeated except that the resin has a weight average molecular weight of about 280,000, a chemically combined chlorine content of about 36 percent by weight, a chemically combined sulfur content of about 1.0 percent by weight, and an average particle size of about 260 microns.

Infrared analysis of a film formed by the procedure of Example 1 from the dried oxidized polymer shows absorbance in the region of 1715 $cm^{-1}$, indicating presence of carbonyl groups on the polymer. The ratio of absorbance at about 1715 $cm^{-1}$ to that at 2720 $cm^{-1}$ is about 2.9.

COMPARATIVE SAMPLES A THROUGH C: UNOXIDIZED CHLORINATED POLYETHYLENE

Samples of the chlorinated polyethylene starting materials of Examples 1, 2 and 5 are molded and cut into configurations appropriate for testing and designated Samples A, B and C, respectively. Molding and cutting are done according to the procedures in Example 1.

Examples 1-7 illustrate the use of the process of the invention to oxidize chlorinated polyethylenes, including a chlorosulfonated polyethylene, having chemically combined chlorine contents from about 25 percent to about 46.5 percent by weight. The chlorinated polyethylenes have molecular weights from about 280,000 to about 2,600,000. Infrared analysis shows that oxidation of the chlorinated polyethylenes by the process of the invention introduces carbonyl groups into the chlorinated polyethylene. Properties of illustrative oxidized chlorinated polyethylenes produced by the process of the invention and some of their starting materials are given in Table I.

EXAMPLE 8

GRAFTING OF STYRENE AND ACRYLONITRILE TO OXIDIZED CHLORINATED POLYETHYLENE USING A SOLUTION PROCESS

About 225 grams of the oxidized chlorinated polyethylene of Example 1 and 15 grams of a proprietary barium cadmium organophorous stabilizing compound available from Ferro Corporation under the trade designation UV Chek ®AM 595 are slowly added to about 585 grams of styrene monomer (inhibited by t-butyl pyrocatechol) in a 2 liter auger reactor. Rotation of the auger is maintained at a rate of about 60 revolutions per minute (rpm) during the addition and continued through the dissolution of the polymer. Four hundred fifty grams of ethylbenzene, 5 grams of epoxidized soybean oil commercially available from Witco Chemical Corportion, Argus Chemical Division, under the trade designation Drapex ® 6.8 and 3 grams of octadecyl-3-(3,5-di-tert-butyl-4-hydroxy phenyl) propionate antioxidant, commercially available from Ciba-Geigy Corporation under the trade designation Irganox ® 1076, are added with continued stirring. Stirring is continued overnight to insure complete mixing and dissolution.

Then 280 grams of acrylonitrile are added over a period of about 2.5 minutes with auger rotation at 90 rpm to maintain a solution during acrylonitrile addition. The reactor is purged with nitrogen gas to remove atmospheric oxygen and pressured to 25 psig (172 kilopascals (KPa)) with nitrogen. Auger rotation is set to 60-80 rpm. About 500 parts per million (ppm) based on weight of styrene and acrylonitrile of benzoyl peroxide dissolved in 50 ml. of ethyl benzene is added.

The reactor and its contents are heated gradually (at a rate of about 3° C. per min.) until the temperature of the contents reaches about 100° C. The rate of agitation is continued at 60-80 rpm and the reaction is allowed to proceed under these conditions for a period of about 3 hours.

After the three hour period, heating is stopped, the reactor valve is opened, and the polymer is removed from the reactor at reaction temperature. The polymer is heated in a vacuum oven at 160°-200° C. for 1 hour to remove solvent and form a devolatilized polymer mass. The oven is allowed to cool to room temperature and the polymer is removed. The polymer mass is ground using a Wiley mill #4 having apertures of about 75 micrometers, into granules of about 200 mesh (U.S. Series) (75 μm). Samples of 55 grams each are compression molded at 225° C. by pressing at 25,000 kg. ram force and shaped into configuration appropriate for testing. The physical properties are measured and are shown in Table I.

EXAMPLES 9 THROUGH 14

GRAFTING OF STYRENE AND ACRYLONITRILE TO OXIDIZED CHLORINATED POLYETHYLENE

The procedure of Example 8 is repeated in Examples (Ex.) 9-14 using respectively the oxidized chlorinated polyethylene resin of Examples 2-7.

Examples 8-14 illustrate grafting of styrene and acrylonitrile onto oxidized chlorinated polyethylenes produced by the process of the invention. Starting material chlorinated polyethylenes have chemically combined chlorine contents of from about 25 percent to 46.5 percent by weight and molecular weights of 280,000 to 2,600,000. Physical properties of illustrative graft copolymers produced by processes of the invention are shown in Table I.

COMPARATIVE SAMPLES D AND E

GRAFTING OF STYRENE AND ACRYLONITRILE TO UNOXIDIZED CHLORINATED POLYETHYLENE

Comparative data is obtained by repeating the procedure of Example 8 in Comparative samples D and E using respectively the (unoxidized) chlorinated polyethylene starting material of Examples 3 and 4.

PHYSICAL PROPERTIES OF OXIDIZED CHLORINATED POLYETHYLENES AND THEIR GRAFT COPOLYMERS WITH STYRENE AND ACRYLONITRILE

Physical properties of some styrene/acrylonitrile graft copolymers of the Examples are shown in Table I. The properties and procedures for their measurement are:
Percent Elongation at Break: ASTM D-638
Tensile at Break (in psi): ASTM D-638
Izod Impact Strenght: ASTM D-256
Dynatup Impact Strength: ASTM D-3029

Physical properties of the oxidized chlorinated polyethylenes of Example 1, 2 and 5 and of corresponding starting materials designated Comparative Samples A through C, respectively, are also in Table I. The properties are measured using the test procedure of ASTM D-624-54 for elongation, tear strength and tensile at break in pounds per square inch (psi). Oxidized and unoxidized chlorinated polyethylenes are elastomeric, but the graft copolymers are not. Different tests were, therefore, necessary.

The chemically combined chlorine content and weight average molecular weight of the starting material is listed for each to facilitate interpretation of data in the Table. Examples are denoted by Ex. Comparative Samples are denoted by C. S.

TABLE I

| Example/ Comparative Sample | % Cl | MW (÷ 1000) | Tensile Break (psi)/(kg/cm2) | % Elongation Ultimate | Tear Strength (lb/in)/(kg/cm) | Izod Impact (ft-lb/in)/ (kg-m/cm) | Dynatup Impact (ft-lb/ kg-m) |
|---|---|---|---|---|---|---|---|
| Ex. 1 | 36 | 280 | 451/31.7 | 982 | 90/16.1 | | |
| C.S. A | 36 | 280 | 911/64.1 | 941 | 112/20.0 | | |
| Ex. 8 | 36 | 280 | 3493/245.7 | 44 | | 6.0/0.33 | 24.0/3.32 |
| C.S. E | 36 | 280 | | | | 2.5/0.14 | 15.0/2.07 |
| Ex. 2 | 46.5 | 100 | 1538/108.2 | 470 | 110/19.6 | | |
| C.S. B | 46.5 | 100 | 1288/90.6 | 394 | 127/22.7 | | |
| Ex. 5 | 25 | 280 | 1027/72.3 | 881 | 315/56.3 | | |
| C.S. C | 25 | 280 | 1188/83.6 | 821 | 444/79.3 | | |
| Ex. 6 | 42 | 280 | 4600/323.6 | 78 | | 4.2/0.22 | 26.4/3.65 |
| C.S. D | 36 | 2600 | 3486/245.2 | 42 | | 2.0/0.11 | 13.5/1.87 |

In Table I, a comparison of the measured properties of oxidized chlorinated polyethylenes of Examples 1, 2 and 5 with those of corresponding unoxidized chlorinated polyethylenes of comparative samples A, B and C, respectively, shows changed physical properties. In each case, the elongation of the oxidized chlorinated polyethylene is greater than that of the corresponding chlorinated polyethylene. In each case, the tear strength of the oxidized chlorinated polyethylene is less than that of the corresponding chlorinated polyethylene. Tensile strength at break is less than that of the corresponding chlorinated polyethylene for oxidized chlorinated polyethylenes having 25 or 36 percent chemically combined chlorine, but is greater in the case of an oxidized chlorinated polyethylene having about 46.5 percent chemically combine chlorine.

A comparison oxidized chlorinated polyethylene grafted with styrene and acrylonitrile as prepared in Example 8 with a similar graft copolymer of a chlorinated polyethylene having the same molecular weight, particle size and proportion of chemically combined chlorine (comparative sample E) shows greater Izod and Dynatup impact strengths of the graft copolymer of oxidized chlorinated polyethylene.

EXAMPLE 15

GRAFTING OF STYRENE/ACRYLONITRILE TO OXIDIZED CHLORINATED POLYETHYLENE

A solution of about 39 pounds (lb.) (17.7 kilograms (kg)) styrene monomer in about 30 lb. (13.6 kg) ethylbenzene is formed in a 40 gallon (151 liter) vessel. About 15 lb. (6.8 kg) of oxidized chlorinated polyethylene of Example 1, is added slowly, and with agitation by impeller. When the polymer is dissolved, 3 lb. (1.36 kg) of the antioxidant of Example 8, 1 lb. (0.45 kg) of the stabilizer of Example 8, 500 ppm, based on weight of total solution, of tert-dodecyl mercaptan as chain transfer agent are added. The reaction is stirred overnight at ambient conditions.

A metering pump then transfers the solution into a reactor having three vessels connected in series such that a product from the first vessel flows into the second and from the second into the third vessel. Each of the three vessels has a rotating tube that stirs material in the vessel. The solution is pumped in and through the vessels at a rate of about 1 lb. (0.45 kg) per hour under 150 psig (10.56 kg/sq cm). A partially polymerized polymer mass exits from the reactor. The ethylbenzene is then removed from the polymer mass in a devolatilizing extruder starting at about 150° C. and ending at 240° C., with a residence time of about 9 hours. The extruded product is then pelletized to a size of about ¼ inch (0.64 cm) long and 1/16 inch (0.16 cm) in diameter.

Example 15 illustrates large scale preparation of a graft of styrene/acrylonitrile to oxidized chlorinated polyethylene.

EXAMPLE 16

OXIDATION OF CHLORINATED POLYETHYLENE USING SODIUM PERSULFATE

About 450 grams of finely-divided chlorinated polyethylene particles are added to 1500 ml deionized water in a 4 liter beaker. The chlorinated polyethylene has a molecular weight of about 280,000; a chemically combined chlorine content of about 36 percent, and an average particle size of about 260 microns (commercially available from The Dow Chemical Company under the trade designation Tyrin TM 3615). The beaker and its contents are allowed to sit until the chlorinated polyethylene particles sink or settle, indicating wetting of the polymer.

The contents are treated with dilute hydrochloric acid to remove possible contaminants. Addition of hydrochloric acid is continued until bubbling ceases. Then the polymer is washed with water until the water has a pH equivalent to that of the water used for washing. The volume of water remaining over the polymer particles is adjusted to about 1500 ml.

The water and polymer particles are stirred to allow contact of water with all surfaces of the particles. Stirring is maintained while 225 grams of granular sodium persulfate is added very slowly over a period of about ten minutes to form an admixture. The admixture is heated to 72° C. over a period of about 1 hour. At about 72° C., foaming and exothermically produced heat are observed. The temperature rises to about 90° C. and is allowed to fall back to 72° C. The admixture is heated to 90° C. to remove hydroperoxide groups that may have formed.

The aqueous phase is decanted from the hot polymer particles. The particles are washed with deionized water until the water decanted from the particles has the same pH it had when added to the particles. The polymer particles are then filtered and dried overnight in a vacuum oven at 50° C.

About 15 grams of the dried oxidized polymer particles are formed into a disk having a diameter of 8 inches (20.32 cm) and a thickness of 5 mils (0.125 mm), using the procedure of Example 1.

Infrared analysis of the disk shows a band in the region of 1711-1713 cm$^{-1}$ corresponding to carbonyl groups. There is no evidence of hydroperoxide or peroxide groups.

EXAMPLE 17

OXIDATION OF CHLORINATED POLYETHYLENE USING POTASSIUM MONOPERSULFATE

The procedure of Example 16 is repeated except that 225 grams of potassium monopersulfate is used for the sodium persulfate. A disk is formed from the resulting polymer particles, by the procedure of Example 1.

Infrared analysis of the disk shows a band in the region of 1711-1713 cm−1 corresponding to carbonyl groups. There is no evidence of hydroperoxide or peroxide groups.

Examples 1, 16 and 17 illustrate the use of various acidic oxidizing agents to produce oxidized chlorinated polyethylene. Each oxidation produces a polymer having carbonyl groups but not having peroxide or hydroxide groups.

EXAMPLE 18

BLENDING POLY(VINYL CHLORIDE) AND OXIDIZED CHLORINATED POLYETHYLENE

A mixture is formed from 100 grams of poly(vinyl chloride) commercially available from Georgia Gulf Corporation under the trade designation 1055, four grams of the oxidized chlorinated polyethylene of Example 1, two grams of high molecular weight polymethylmethacrylate commercially available from Rohm and Haas Company under the trade designation K120N, 6.8 grams glycerol monosterate as lubricant, two grams of methyl tin mercaptide heat stabilizer available from Carstab Division of Morton Thiokol, Inc. under the trade designation TM181, and 0.3 grams of an ester montan acid available from American Hoechst Corp. under the trade designation WAX E. The mixture is formed in a Waring blender or by stirring at high speed using a Waring Blender mixer. The mixture is removed, placed on a roll mill and fused at 150° C.

After fusion, the mixture is roll milled for five minutes at a temperature of 150° C. into a sheet having a thickness of 3.2 mm. The sheet is removed from the roll mill while hot and cut into rectangles 6" by 8" (15.24 cm. by 20.32 cm.).

Two of the rectangles are placed into separate chases made of steel, each measuring 6" by 8" by 0.125" (15.24 cm. by 20.32 cm. by 0.3175 cm.). A PHI (Pasadena Hydraulic, Inc.) hydraulic press (model SB234C-X-ms-X24) is then preheated to 372° F. (189° C.). A ram force of 25,000 kg. is preset. A rectangle in a chase is placed into the press and heated at 189° C. at a pressure setting of 35,000 kg. for two minutes, then at the same temperature under 25,000 kg. of ram force for 4 minutes. The rectangle is then cooled to room temperature under 25,000 kg of ram force. Rectangles molded by this procedures are then cut to the sizes and shapes designated by the ASTM test procedures used to measure properties of interest.

EXAMPLES 19-22

BLENDING POLY(VINYL CHLORIDE) AND OXIDIZED CHLORINATED POLYETHYLENE

The procedure of Example 18 is repeated in Examples (Ex.) 19-22 using respectively eight, ten, twelve and fourteen grams of oxidized chlorinated polyethylene prepared according to the procedure of Example 1.

Examples 19-22 illustrate blending poly(vinyl chloride) with varying amounts of an oxidized chlorinated polyethylene prepared in accordance with the present invention. Physical properties of the blends are shown in Table II.

COMPARATIVE SAMPLES F-L

The procedure of Example 18 is repeated in Samples F-L using, respectively, four, eight, ten, twelve, fourteen and zero grams of unoxidized chlorinated polyethylene corresponding to the starting material used to prepare the oxidized chlorinated polyethylene used in Examples 18-22.

PHYSICAL PROPERTIES OF OXIDIZED CHLORINATED POLYETHYLENE AND ITS BLENDS WITH POLYVINYL CHLORIDE

Physical properties of the polyvinyl chloride blends of Examples 18-22 and Comparative Samples F-L are shown in Table II. The properties and procedures for their measurement are:
Flexural modulus; ASTM D-790
Flexural strength; ASTM D-790
Tensile Yield; ASTM D-638
Tensile at Break; ASTM D-638
Izod Impact Strength; ASTM D-256
Dynatup Impact Strength; ASTM D-3029

PHR refers to the parts of oxidized or unoxidized chlorinated polyethylene per hundred parts of poly(vinyl chloride) in each example. All data represents an average of five tests except the measurements of flexural modulus and flexural strength of the product of Example 18.

TABLE II

| BLEND | PHR | FLEXURAL MODULUS PSI/KPa | FLEXURAL STRENGTH PSI/KPa | TENSILE YIELD PSI/KPa | TENSILE BREAK PSI/KPa | IZOD IMPACT NOTCHED (ft-lb/in)/(kg-m/cm) | DYNATUP IMPACT (ft-lb)/(kg-m) |
|---|---|---|---|---|---|---|---|
| C.S. F | 4 | 408,170/ 2,814,233 | 12,670/ 87,357 | 7148/ 49,284 | 5467/ 37,694 | 0.83(±0.17)/0.045(±0.009) | 44.02/6.1 |
| Ex. 18 | 4 | 475,000/ 3,275,010 | 12,800/ 88,253 | 7418/ 51,145 | 5207/ 35,901 | 0.92(±0.06)/0.050(±0.003) | 51.63/7.1 |
| C.S. G | 8 | 413,622/ 2,851,823 | 11,285/ 77,807 | 6449/ 44,464 | 5151/ 35,515 | 2.4(±0.125)/0.130(±0.006) | 51.56/7.1 |
| Ex. 19 | 8 | 379,741/ | 11,585/ | 6792/ | 5152/ | 1.52(±0.15)/0.083(±0.008) | 54.22/7.5 |

TABLE II-continued

| BLEND | PHR | FLEXURAL MODULUS PSI/KPa | FLEXURAL STRENGTH PSI/KPa | TENSILE YIELD PSI/KPa | TENSILE BREAK PSI/KPa | IZOD IMPACT NOTCHED (ft-lb/in)/(kg-m/cm) | DYNATUP IMPACT (ft-lb)/(kg-m) |
|---|---|---|---|---|---|---|---|
| | | 2,618,221 | 79,876 | 46,829 | 35,522 | | |
| C.S. H | 10 | 396,198 | 11,174 | 6688/ | 4421/ | 2.3(±0.60)/0.125(±0.033) | 56.06/7.8 |
| | | 2,731,689 | 77,042 | 46,112 | 30,482 | | |
| Ex. 20 | 10 | 396,336/ | 11,186/ | 6905/ | 3880/ | 2.5(±0.31)/0.136(±0.017) | 57.65/8.0 |
| | | 2,732,640 | 77,124 | 47,608 | 26,752 | | |
| C.S. J | 12 | 345,077/ | 10,557/ | 6265/ | 5612/ | 6.0(±6.5)/0.327(±0.354) | 55.38/7.7 |
| | | 2,379,222 | 72,788 | 43,196 | 38,693 | | |
| Ex. 21 | 12 | 368,448/ | 10,664/ | 6118/ | 3740/ | 7.38(±6.3)/0.402(±0.343) | 52.34/7.2 |
| | | 2,540,359 | 73,526 | 42,182 | 25,786 | | |
| C.S. K | 14 | 352,919/ | 9,950/ | 5554/ | 5999/ | 13.5(±8.5)/0.735(±0.463) | 55.38/7.7 |
| | | 2,433,290 | 68,603 | 38,293 | 41,362 | | |
| Ex. 22 | 14 | 344,304/ | 10,060/ | 5964/ | 5172/ | 19.1(±1.15)/1.040(±0.063) | 47.7/6.6 |
| | | 2,373,892 | 69,361 | 41,120 | 35,660 | | |
| C.S. L | 0 | 419,052/ | 12,396/ | 7779/ | 4609/ | ~0.5/0.027 | 1.9/0.3 |
| | | 2,889,261 | 85,467 | 53,634 | 31,778 | | |

The data in Table II shows a variation in properties with different amounts of chlorinated polyethylene oxidized by the process of the invention blended into poly(vinyl chloride). Table II also shows that physical properties of poly(vinyl chloride) blended with oxidized chlorinated polyethylene (Examples 18-22) differ from the physical properties of poly(vinyl chloride) having corresponding amounts of unoxidized chlorinated polyethylene (Comparative Samples F-K). In each case, a physical property of a blend of oxidized chlorinated polyethylene in the indicated relative proportion, as represented by Ex. 18-22, is compared with that property of the comparative sample (C.S.) having the same relative proportion of unoxidized chlorinated polyethylene, comparative samples F-K, respectively.

There is generally little variation in flexural modulus or flexural strength between an example and the corresponding comparative sample. With the exception of Ex. 21 and Comparative Sample J, the tensile yield of the blend containing an oxidized chlorinated polyethylene is generally greater than that of the corresponding comparative sample. Tensil break of a blend containing oxidized chlorinated polyethylene of the present invention is generally equal to or less than that of a corresponding blend containing unoxidized chlorinated polyethylene. With the exception of Ex. 19 and Comparative Sample G containing 8 parts per hundred of oxidized and unoxidized chlorinated polyethylene, respectively, blends containing oxidized chlorinated polyethylene generally have greater Izod impact strengths than corresponding comparative samples. Differences between Izod impact strengths of blends having oxidized and unoxidized chlorinated polyethylene generally increase with increasing relative proportion of oxidized or unoxidized chlorinated polyethylene. Dynatup impact strength of a blend containing oxidized chlorinated polyethylene is generally greater than that of a corresponding comparative sample for blends containing 4 to 10 parts per hundred oxidized chlorinated polyethylene, but is generally less than that of a corresponding comparative sample for blends containing 12 to 14 parts per hundred oxidized chlorinate polyethylene. Optimum concentrations of oxidized chlorinated polyethylene in poly(vinyl chloride) can be chosen for desired combinations of properties.

Examples 1-7 illustrate the oxidation of chlorinated polyethylenes, and Examples 8-14 illustrate use of the oxidized polymers as effective grafting substrates. The oxidized polymers, when grafted, generally have greater impact strength than have similar graft polymers prepared from unoxidized chlorinated polyethylene. Examples 18-22 illustrate modification of physical properties of a polymer by blending with an oxidized chlorinated polyethylene. Example 15 illustrates a larger scale grafting process than that of Example 8. Examples 1, 16, and 17 illustrate the use of various acidic oxidizing agents in the process of the invention. Similar results are expected with other halogenated olefin polymers, halogenated rubbers, oxidizing agents, grafting monomers and the like, all of which are detailed herein.

EXAMPLE 23

GRAFTING OF METHYLMETHACRYLATE TO OXIDIZED CHLORINATED POLYETHYLENE USING A SUSPENSION PROCESS

About 1200 grams of finely divided chlorinated polyethylene particles are placed in a 8 liter stainless steel beaker containing about 5000 grams of water. The chlorinated polyethylene (CPE) has a number average molecular weight of 280,000 a chemically combined chlorine content of about 36 weight percent, and a particle size of 90 microns. The CPE is allowed to become wet, as indicated by the polymer sinking to the bottom of the beaker.

The CPE is treated with dilute hydrochloric acid to remove possible contaminants. Hydrochloric acid is added slowly until foaming ceases. The polymer is then washed with water until the water has a neutral pH. The amount of water over the resin adjusted to 5000 grams.

A slurry of the halogenated polyolefin is maintained in suspension by stirring with a propeller at about 120 revolutions per minute (RPM). About 120 grams potassium persulfate salt (15% based on the weight of dry CPE) is added steadily over a period of about 15 seconds. The slurry is heated to 62° C., and this temperature is maintained for about four (4) hours. The slurry is then allowed to cool to 35° C. Two hundred grams (200 g) of methylmethacrylate monomer is then added at a rate of about five (5) milliters per minute to form a reaction mixture, which is heated to 62° C. for 3 hours.

The reaction mixture is heated to 90° C. for an additional two hours to form a product and complete the reaction. The product is placed in a perforated centrifuge beeker and washed with water until the removed water has the same pH as the water initially has (about pH 7). A centrifuge is also used to remove water from the product. A fluidized bed equipped with an air blower is used to dry the product. The product is dried at 55° C. for about 1 hour.

A 50 gram sample of the polymer is placed in a stainless steel holder 2⅜" high 2¾" outside diameter and 2⅛" inside diameter, then is placed in an oven at 60° C. for 3 hours under 60 psig. of pressure. The sample is then allowed to cool. The product of this example remains generally free flowing; therefore caking is not measured. By way of comparison, a sample of CPE corresponding to the starting material of this Example, which CPE is not oxidized or grafted, forms a block requiring a force on the order of 250 pounds to break as measured using an Instron 1122 having a wedge.

EXAMPLE 24–26 AND COMPARATIVE SAMPLES M, N AND F
BLENDS OF METHYLMETHACRYLATE-GRAFTED OXIDIZED CHLORINATED POLYETHYLENE AND POLY(VINYL CHLORIDE)

The procedure of Example 23 is repeated for Examples 24–26 except that the potassium persulfate is used in an amount equal to 12% by weight based on weight of CPE and methylmethacrylate issued in an amount equal to about 20% by weight based on CPE, and the CPE starting material has a number average molecular weight of about 280,000, a chemically combined chlorine content of about 36 percent by weight and a particle size of about 90 microns.

After preparation, washing and drying as in Example 23, the grafted oxidized chlorinated polyethylene is blended with poly(vinyl chloride) using a Haake Torque Rheometer commercially available from HBI Haake Buchler Instrument, Inc. with the mixing rates and at the temperatures indicated in Table III for 6 min. The poly(vinyl chloride) is a 36,000 number average molecular weight poly(vinyl chloride) commercially available from Georgia Gulf Corporation under the trade designation 2066 (K55) resin.

For Comparative Samples M, N and P, unoxidized, ungrafted starting material CPE of Examples 24–26 is used in place of the grafted, oxidized CPE.

Samples are shaped and Izod impact measured as in Example 18.

TABLE III

| Sample | Stirring rate (RPM) | Temp. °C. | Notched Izod Impact (ft. lb/in) | Standard Deviation |
|---|---|---|---|---|
| C.S.M | 45 (low shear) | 165 | 3.6 | 0.2 |
| Example 24 | 45 (low shear) | 165 | 18.0 | — |
| C.S.N | 60 (med shear) | 165 | 3.6 | — |
| Example 25 | 60 (med shear) | 165 | 19.6 | 0.7 |
| C.S.P | 75 (high shear) | 180 | 21.7 | 0.3 |
| Example 26 | 75 (high shear) | 180 | 20.8 | 0.8 |

The data in Table III show that a methylmethacrylate grafted oxidized chlorinated polyethylene is an effective impact modifier when blended with poly(vinyl chloride) at low and medium shear rates.

EXAMPLES 27–28
BLENDS OF VINYLACETATE GRAFTED OXIDIZED CHLORINATED POLYETHYLENE

The procedure of Example 24 is repeated using the chlorinated polyethylene (CPE) of Example 1, and using an amount of vinyl acetate equivalent to 20 percent by weight based on CPE in place of the methylmethacrylate; potassium persulfate is used in an amount equivalent to 0.05 percent by weight based on CPE to produce a methylmethacrylate grafted oxidized CPE. Blends of 12 parts by weight grafted oxidized CPE with 100 parts by weight of the poly(vinyl chloride) used in Example 24 are formed as in that example.

Notched Izod impact is measured as in Example 18 and is given in Table IV.

EXAMPLE 29
BLENDS OF BUTYLACRYLATE GRAFTED OXIDIZED CHLORINATED POLYETHYLENE

The procedure of Example 27 is repeated except that an amount of butylacrylate equivalent to 20 percent by weight based on CPE is used in place of the vinylacetate. The notched Izod impact strength is measured and is given in Table IV.

COMPARATIVE SAMPLE Q
A BLEND OF UNOXIDIZED CHLORINATED POLYETHYLENE IN POLY(VINYL CHLORIDE)

A blend of 12 parts the starting material CPE of Example 27 is formed in 100 parts by weight poly(vinyl chloride) by the procedure of Comparative Sample M, except at the stirring rates indicated in Table IV. The notched Izod impact strength is shown in Table IV.

TABLE IV

| Sample | Stirring rate (RPM) | °C. | Notched Izod (ft. lb/in) | Standard Deviation |
|---|---|---|---|---|
| Example 27 | 60 (med shear) | 180 | 10.6 | 8.1 |
| Example 28 | 52 (Low med shear) | 180 | 15.5 | 8.1 |
| Example 29 | 60 (med shear) | 180 | 9.8 | 7.4 |
| C.S.Q | 60 (med shear) | 180 | 2.1 | 0.1 |

The data in Table IV shows that a vinyl acetate grafted oxidized chlorinated polyethylene is an effective impact modifier for poly (vinyl chloride).

EXAMPLES 30–31
EFFECT OF DEGREE OF OXIDATION ON IMPACT STRENGTH

The procedure of Example 24 is followed except that the CPE of Example 1 is used and the amount of potassium persulfate is equivalent to 15 weight percent based on dry weight of CPE for Example 30 and is equivalent to 2 weight percent based on dry weight of CPE for Example 31. For both Examples 30 and 31, about 20% by weight m;ethylmethacrylate is used for grafting. Blends of 12 parts by weight grafted oxidized CPE and 100 parts by weight poly(vinyl chloride) are prepared as in Example 24 at 180° C. and at the stirring rate indicated in Table V.

Samples are formed and notched Izod impact strength is measured as in Example 18. Results are shown in Table V.

TABLE V

| Sample | Stirring rate (RPM) | °C. | Notched Izod (ft. lb/in) | Standard Deviation |
|---|---|---|---|---|
| Example 30 | 60 | 180 | 11.6 | 9.2 |
| Example 31 | 60 | 180 | 3.0 | — |

Table V shows that grafted CPE having a lower degree of oxidation, as illustrated by Example 31, imparts less impact strength to a poly(vinyl chloride) blend therewith than does a grafted CPE having a relatively higher degree of oxidation, as illustrated by Example 30.

We claim:

1. A process of preparing a graft copolymer comprising steps of
   (a) forming an admixture of (1) an acidic oxidizing agent selected from the group consisting of peroxydisulfuric acid, and its alkali and alkaline earth metal salts and (2) a suspension of a particulate halogenated polymer selected from the group consisting of halogenated olefin polymers and halogenated rubbers in a polar liquid;
   (b) heating the admixture to a temperature sufficient to initiate reaction between the polymer and the oxidizing agent; and
   (c) continuing the reaction until an oxidized polymer having a preselected extent of oxidation is obtained
   (d) grafting to the oxidized polymer at least one addition polymerizable compound.

2. The process of claim 1 wherein the step of grafting comprises:
   (1) contacting the oxidized polymer with at least one addition polymerizable compound thereto;
   (2) initiating reaction between the oxidized polymer and said compound; and
   (3) continuing the reaction until a graft copolymer having a preselected extent of grafting is obtained.

3. The process of claim 2 wherein initiating reaction between the oxidized polymer and said compound is accomplished using heat, a chemical polymerization initiator, or wave energy.

4. The process of claim 2 wherein the halogenated polymer is a chlorinated polyethylene having a chemically combined chlorine content of from about 25 percent to about 50 percent by weight.

5. The process of claim 2 wherein the polymerizable compound is selected from the group consisting of styrene, divinyl benzene, vinyl toluene, acrylonitrile, acrylamide, vinyl acetate, methylmethacrylate, ethylmethacrylate, hydroxyethylmethacrylate, iso-propylmethacrylate, n-propylmethacrylate, iso-butylmethacrylate, n-butylmethacrylate, t-butylmethacrylate, n-octylmethacrylate, cyclohexylmethacrylate, glycidylmethacrylate, methacrylic acid, methylacrylate, ethylacrylate, hydroxyethylacrylate, isopropylacrylate, n-propylacrylate, iso-butylacrylate, n-butylacrylate, t-butylacrylate, n-octylacrylate, cyclohexylacrylate, glycidylacrylate, acrylic acid, free radical polymerizable addition products thereof and mixtures thereof.

6. The process of claim 2 wherein the polymerizable compound is selected from the group consisting of styrene, acrylonitrile, free radical polymerizable addition products thereof, and mixtures thereof.

7. The process of claim 1 wherein a non-caking graft copolymer is formed.

8. The process of claim 7 wherein the acidic oxidizing agent is used in an amount equivalent to from about 0.5 to about 2 weight percent based on halogenated polymer.

9. The process of claim 8 wherein the acidic oxidizing agent is used in an amount equivalent to from about 0.5 to about 1 weight percent based on halogenated polymer.

10. The process of claim 7 wherein a graft copolymer containing from about 1 to about 40 weight percent graftable compound based on weight of graft copolymer is produced.

11. The process of claim 10 wherein a graft copolymer containing from about 2 to about 20 weight percent graftable compound based on weight of graft copolymer is produced.

* * * * *